April 10, 1951 W. A. BIERMANN ET AL 2,547,995
FLUID FLOW CONTROL DEVICE
Filed March 26, 1947 2 Sheets-Sheet 1

INVENTORS
WILLIAM A. BIERMANN
VERNON R. PAWELSKY
BY
John W. Michael
ATTORNEY.

April 10, 1951 W. A. BIERMANN ET AL 2,547,995
FLUID FLOW CONTROL DEVICE
Filed March 26, 1947 2 Sheets-Sheet 2
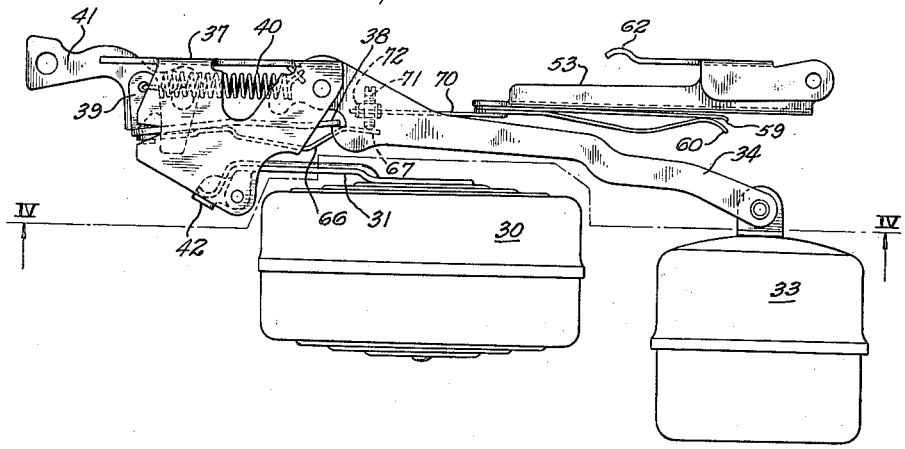
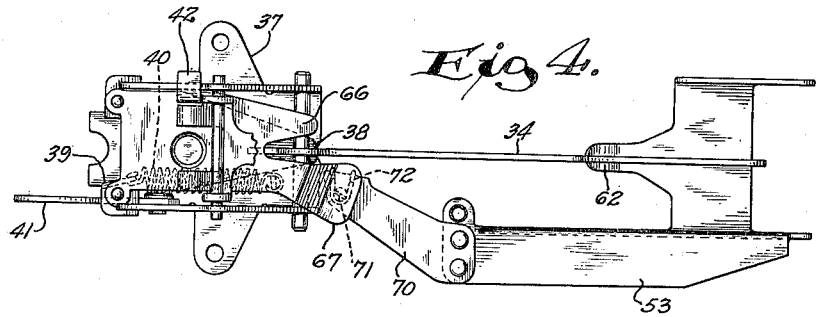
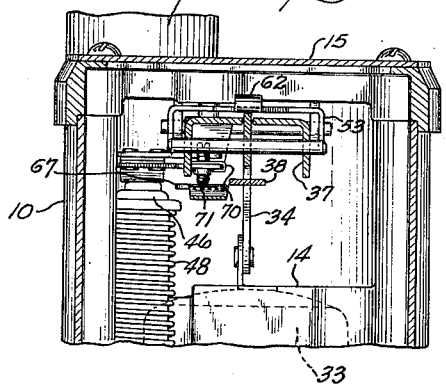
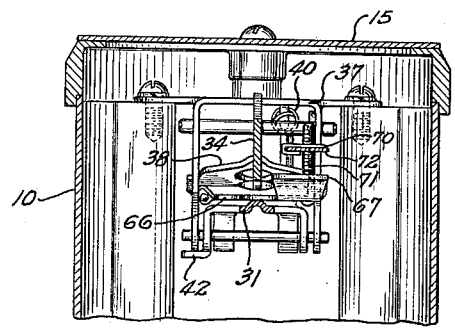
INVENTORS
WILLIAM A. BIERMANN
VERNON R. PAWELSKY
BY
John W. Michael
ATTORNEY.

Patented Apr. 10, 1951

2,547,995

UNITED STATES PATENT OFFICE 2,547,995

FLUID FLOW CONTROL DEVICE

William A. Biermann and Vernon R. Pawelsky, Milwaukee, Wis., assignors to A P Controls Corporation, a corporation of Wisconsin Application March 26, 1947, Serial No. 737,300

4 Claims. (Cl. 137—68)

This invention relates to improvements in liquid flow control devices of the constant level type and particularly to a structure in which the inlet and outlet valves may be substantially simultaneously closed.

In liquid flow control devices such as herein disclosed, it is desirable that the liquid level be kept constant within relatively close limits. However, even though the inlet valve and its seat are manufactured to practical standards of high precision, it is difficult to avoid producing an occasional valve which will be leaky. If the device should have a leaky inlet valve, closure of the outlet valve allows accumulation of liquid until the liquid level lifts a float actuated safety device sufficiently to cause forcible closure of the inlet valve whereupon it is necessary for the user to reset the device manually at the device itself.

When the liquid controlled is fuel supplied to an electrically ignited burner and upon failure of the ignition circuit of the burner, proper operation requires that both the inlet and the outlet valve be closed until the electric circuit has been reenergized whereupon the control should be immediately operative without attention on the part of the user. Under the above conditions particularly, a control device with a leaky valve may even become dangerous because of the rise in liquid above the desired level and the increase in the hydraulic head acting on the outlet valve, even if re-ignition occurs before the safety float has tripped.

It is therefore one object of the present invention to provide a liquid flow control device with means for closing the inlet valve simultaneously with closing of the outlet valve.

Another object of the invention is to provide mechanical means for simultaneously closing both the inlet and the outlet valves of a device of the constant level type controlling the flow of liquid to a liquid fuel burner.

And a further object of the invention is to provide a fuel flow control device of the constant level type in which safety of operation is enhanced by closure of the inlet valve simultaneously with closure of the outlet valve and without operation of the safety means forcibly closing the inlet valve and thereby avoid necessity for manually re-setting the control after each closure of the inlet valve.

Objects and advantages other those above set forth will be apparent from the following description when read in connection with the accompanying drawings, in which:

Fig. 3 is a side elevation of the floats and leverages acting on the inlet valve of the present device together with the level acting on the outlet valve of the present device;

Fig. 4 is a view taken on the planes through the broken line IV—IV of Fig. 3 and looking at the leverages in such figure in the direction of the arrows;

Fig. 5 is a vertical transverse section taken on the planes of broken line V—V of Fig. 1, and Fig. 6 is a vertical transverse section taken on the planes of broken line VI—VI of Fig. 1, omitting the inlet valve of the device.

Figure 2:
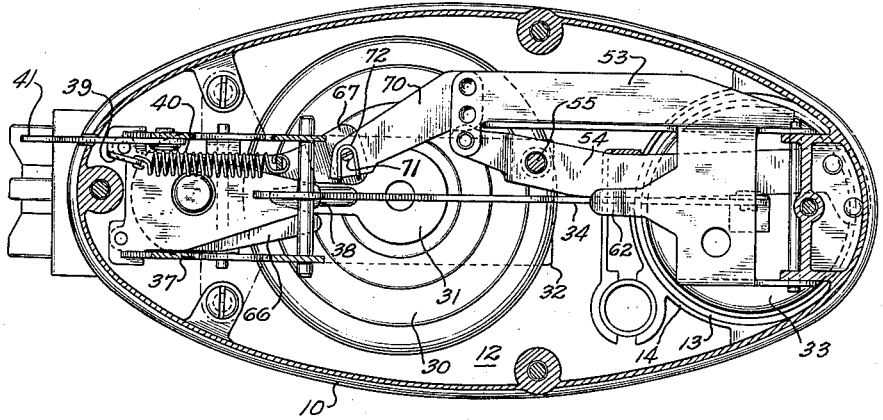
Fig. 2 is a section view taken on the horizontal planes through broken line II—II of Fig. 1.
Figure 1:
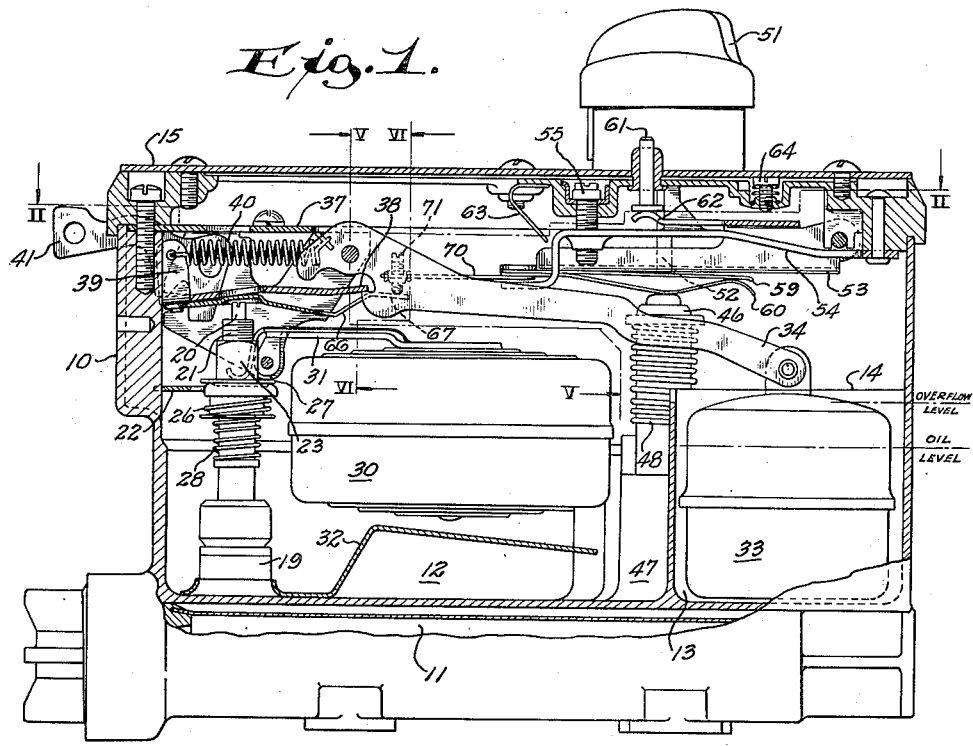
Fig. 1 is a vertical sectional view on substantially the longitudinal axis of a constant level type flow control device embodying the present invention.

Referring particularly to the drawings, a casing 10 has an inlet passage 11 formed in the wall thereof and is substantially divided into a main chamber 12 and an auxiliary chamber 13 by a partial partition 14 and is closed by a cover 15. A hollow boss 19 is formed on a wall of the casing and extends into the main chamber 12 to provide a passageway in which is formed a seat for an inlet valve of the needle type of which only a portion is shown at 20. A sleeve 21 is fixed on the valve 20 and has placed thereon a member 22 having a square seat therein to receive the end of a square nut 23. A spring 26 is compressed between a flange on sleeve 21 and member 22 to hold the member and the nut in a given position on the sleeve. The member 22 has a forked projection engaging with a rib on a wall of the chamber 12 to guide the valve in its movements. The guide 22 has bosses from one surface thereof on a diameter of the valve and a washer 27 is seated on such bosses for rocking movement. The valve is urged toward the open position by a spring 28 seating on the boss 19 and acting against the sleeve 21. Closing movement of the valve, under normal conditions, is controlled by a float 30 charged with a vaporizable liquid and with a lever arm 31 pivotally mounted on the casing and having a forked arcuate end bearing on the washer 27 to urge the valve in the closing direction as the liquid level in the chamber 12 rises. A resilient stop 32 is fixed on the boss 19 and extends beneath the float 30 to prevent forcible contact of such float on the chamber bottom as when the device is shipped or otherwise handled.

Whenever the liquid level in chamber 12 rises above the level of the partition 14 the excess liquid flows into the auxiliary chamber 13 and raises an auxiliary float 33 which is pivotally connected at one end with a lever 34. Such lever is pivoted in a bracket 37 fixed in the main chamber 12 and extending over the inlet valve. The end of the lever 34 adjacent to the pivot thereof is formed with jaws engageable with a plate 38 which has sharpened edges bearing in notches in the edges of bracket 37 and has a lug 39 connected by a tension spring 40 with the bracket 37. The spring 40 snaps the plate 38 downwardly upon lifting of the auxiliary float 33 to disengage the jaw end of the lever from such plate and the plate forcibly strikes on the end of the inlet valve 20 to drive such valve into the closed position. When the striker plate 38 has snapped downwardly to close the inlet valve, it is necessary to remove the liquid from chamber 13 to return the float 33 and its lever 34 to the position shown in the drawings, whereupon the striker plate may be lifted by means of a lever 41 pivoted on the bracket 37 and extending beyond the casing 10, to the position at which the jaw end of lever 34 may again engage the striker plate. The arcuate end of the main float lever 31 has a lug 42 extending laterally therefrom to engage under a side of the bracket and to limit downward movement of the main float 30.

Discharge of liquid from the chamber 12 is controlled by an outlet valve 46 extending into a hollow boss 47 formed in the chamber 12 and providing a seat for the outlet valve. The outlet valve is urged upwardly in the opening direction by a spring 48 acting between the boss 47 and a flange on the outlet valve. The degree of opening of the outlet valve is limited by a vertically adjustable hand knob 51 with a stud 52, the structure of the knob and stud and the means for securing vertical movement thereof being disclosed in Patent 2,293,903 issued to Johnson on August 25, 1942. A lever 53 is pivoted on a removable top portion of the casing 10 and is limited in its movement in one direction by a stiffly resilient arm 54 fixed on the casing top portion and positioned therein by a screw 55 mounted in the casing. A leaf spring 59 is secured at one end on the lever 53 and bears on another leaf spring 60 which is engageable with the end of the outlet valve 46. Lever 53 is formed with a hole immediately over outlet valve 46 so that stud 52 may bear directly on spring 59 thus resiliently limiting upward movement of the valve to the degree determined by manual setting of stud 52. The degree of opening of the outlet valve may also be automatically controlled by means such as a thermostat actuating a heat motor as is disclosed, for example, in Patent 2,369,739 issued to Johnson et al. on February 20, 1945. Such heat motor is engageable with a pin 61 extending through the cover 15 and contacting with a finger 62 preferably formed as a portion of the lever 53. Maximum upward movement of lever 53 is fixed at the factory by bending an ear 63 into the path of lever movement while the maximum movement for a particular burner is determined by the setting of screw 64 upon installation thereby further limiting movement of lever 53.

A plate 66 is pivotally mounted between the lever 31 of the main float 30 and the striker 38, to be lifted upon rising of the inlet valve and such plate has an offset ear 67 extending toward the outlet valve 46. An extension 70 is fixed on the end of that portion of lever 53 which is nearest to the inlet valve and the extension projects into the path of movement of the plate ear 67. Contact between the ear 67 and the extension 70 is determined by adjustment of a screw 71 which may be locked in adjusted position by a resilient U-shaped clip 72 engageable with the screw threads and over the edge of the lever extension 70.

The operation of the device will now be described, assuming that the outlet valve has been adjusted to allow fuel flow up to a pre-determined limit and that a suitable device is provided for actuating the pin 61 to vary the position of the outlet valve as is required responsive to operation of a remotely placed thermostat. The outlet valve 46 is opened by the spring 48 to the position determined by contact with the spring 60 on lever 53 which raises such lever into contact with the end of the pin 61. The inlet valve 20 is opened by the spring 28 to the degree permitted by the float 30 and maintains a liquid level in chamber 12 at a pre-determined height with only such minor variations in level as are due to lag between the movements of the several valves in the same direction. When the demand for heat has been satisfied, the thermostat causes pressure to be exerted on the pin 61 which acts on lever 53 and through spring 60 to close the outlet valve 46. After a very slight rise in level in chamber 12, the float 30 should now close the inlet valve 20.

Closure of the inlet valve should take place as soon as possible after closing of the outlet valve and operation of the striker 38 should be avoided particularly if a leak through the inlet valve is due only to imperfect matching of the valve point and seat because operation of the striker may accentuate the imperfect seating. The present structure provides an adjustable leverage for mechanically interconnecting the valves for operation in the closing direction but allows relative valve movements in the opening direction up to a limit which is determined by the position of the stud 52 or the pin 61. The plate 66 rests on the end of inlet valve 20 with its ear 67 movable, in a path for engagement with the screw 71 on lever extension 70 and until such engagement occurs. If the outlet valve is closed by downward pressure on the lever 53, such pressure is also transmitted through the lever extension 70 and screw 71 to plate 66 which presses on the end of and closes the inlet valve. Hence, closing of the outlet valve substantially simultaneously causes closing of the inlet valve by a gradual pressure best adapted to stop leaking of imperfect valves. But if such closing of the inlet valve is inadequate to stop leaking, the liquid level in chamber 12 will continue to rise until the auxiliary chamber 13 is filled and auxiliary float 33 then trips the striker 38 to force the inlet valve on its seat.

It will be seen by reference particularly to Fig. 4 of the drawing that lever 53 and its extension 70 are considerably longer than the plate 66. Therefore movement of lever 53, 70 through a given angle multiplies movement or causes movement of plate 66 through a considerably greater angle. The force exerted on lever 53, 70 and by such lever on the inlet valve 20, is therefore multiplied by the same amount and, in constructions now in use, is adequate to cause seating of imperfectly matched needle points and seats.

Although but one embodiment of the present invention has been illustrated and described, it will be apparent to those skilled in the art that various changes and modifications may be made therein without departing from the spirit

We claim:

1. A liquid flow control device comprising in combination, a casing having inlet and outlet ports, inlet and outlet valves for said ports adapted to control liquid flow into and out of the casing, a spring biasing said inlet valve toward its open position, float means responsive to the liquid level in said casing and including means for limiting the opening movement of said inlet valve in accordance with the liquid level in said casing to maintain a liquid level in the casing, means for regulating movement of said outlet valve in accordance with flow demand and including means for closing said inlet valve substantially simultaneously with closure of said outlet valve, said last-named means being operative to close said inlet valve independently of said float means and without affecting said limiting means.

2. A liquid flow control device comprising, a casing having inlet and outlet ports, inlet and outlet valves associated with said ports to regulate flow into and out of the casing, float means acting on said inlet valve to control the flow into the casing in accordance with variations in the liquid level in the casing, thermostatic means controlling movement of said outlet in accordance with demand, and means operative upon closure of said outlet valve by said thermostatic means to act directly on the inlet valve independently of said float means to close the inlet valve.

3. A liquid flow control device comprising, in combination, a casing having inlet and outlet ports, inlet and outlet valves for said ports adapted to control liquid flow into and out of the casing, a spring biasing said inlet valve toward its open position, float means in said casing connected to said inlet valve to regulate valve movement in accordance with liquid level in the casing to maintain a predetermined level in said casing, a lever pivotally mounted in the casing and acting on said inlet valve, leverage means mounted in said casing and acting on said outlet valve, thermostatic control means acting on said leverage means to regulate movement of said outlet valve in accordance with flow demands, and means for engaging said leverage means and said lever when said control means closes said outlet valve to substantially simultaneously close said inlet valve.

4. A liquid flow control device comprising, in combination, a casing having inlet and outlet ports, inlet and outlet valves for said ports adapted to control liquid flow into and out of the casing, a spring biasing said inlet valve toward its open position, float means in said casing connected to said inlet valve to regulate valve movement in accordance with liquid level in the casing to maintain a predetermined level in said casing, a lever pivotally mounted in the casing and acting on said inlet valve, leverage means mounted in said casing and acting on said outlet valve, thermostatic control means acting on said leverage means to regulate movement of said outlet valve in accordance with flow demands, means for engaging said leverage means and said lever when said control means closes said outlet valve to substantially simultaneously close said inlet valve, striker means mounted in said casing and adapted to deliver a sharp blow to said lever to forcibly close said inlet valve and being normally maintained in an inoperative position, and means responsive to a predetermined increase in liquid level over said maintained level to release said striker means and forcibly close said inlet valve.

WILLIAM A. BIERMANN.
VERNON R. PAWELSKY.

REFERENCES CITED

The following references are of record in the file of this patent:

UNITED STATES PATENTS

| Number | Name | Date |
|---|---|---|
| 1,892,765 | Howard | Jan. 3, 1933 |
| 2,065,087 | May | Dec. 22, 1936 |
| 2,199,538 | Curry | May 7, 1940 |
| 2,317,556 | Russel | Apr. 27, 1943 |
| 2,354,755 | Johnson | Aug. 1, 1944 |
| 2,389,519 | Landon | Nov. 20, 1945 |
| 2,427,059 | Landon | Sept. 9, 1947 |